United States Patent [19]

Oksanen et al.

[11] Patent Number: 5,651,034
[45] Date of Patent: Jul. 22, 1997

[54] METHOD AND EQUIPMENT FOR MONITORING THE FILL RATE OF AN ELASTIC BUFFER MEMORY IN A SYNCHRONOUS DIGITAL TELECOMMUNICATION SYSTEM

[75] Inventors: Toni Oksanen; Esa Viitanen, both of Espoo, Finland

[73] Assignee: Nokia Telecommunications Oy, Espoo, Finland

[21] Appl. No.: 347,386

[22] PCT Filed: Jun. 1, 1993

[86] PCT No.: PCT/FI93/00238

§ 371 Date: Feb. 3, 1995

§ 102(e) Date: Feb. 3, 1995

[87] PCT Pub. No.: WO93/25031

PCT Pub. Date: Dec. 9, 1993

[30] Foreign Application Priority Data

Jun. 3, 1992 [FI] Finland .................................. 922567

[51] Int. Cl.⁶ .................................................. H04L 12/52
[52] U.S. Cl. .............................................. 375/372; 370/503
[58] Field of Search .................................. 375/372, 371; 370/102, 112, 99, 84, 100.1, 105.1, 91, 95.3

[56] References Cited

U.S. PATENT DOCUMENTS

| 5,067,126 | 11/1991 | Moore | 370/112 |
| 5,091,907 | 2/1992 | Wettengel | 370/102 |

FOREIGN PATENT DOCUMENTS

| 0435130 | 7/1991 | European Pat. Off. | H04J 3/07 |
| 4018687 | 1/1991 | Germany | H04J 3/16 |
| 4018536 | 12/1991 | Germany | H04L 12/50 |
| 9118457 | 11/1991 | WIPO | H04J 3/07 |

*Primary Examiner*—Stephen Chin
*Assistant Examiner*—Hai H. Phan
*Attorney, Agent, or Firm*—Cushman Darby & Cushman IP Group of Pillsbury Madison & Sutro LLP

[57] ABSTRACT

A method and an equipment for monitoring the fill rate of an elastic buffer memory used in a synchronous digital telecommunication system, such as the SDH or SONET system. To enable the monitoring of the fill rate of the channels with less hardware than previously, the fill rate of at least two channels of the same level of hierarchy is monitored on a time-division basis in a monitoring unit common to the channels.

3 Claims, 8 Drawing Sheets

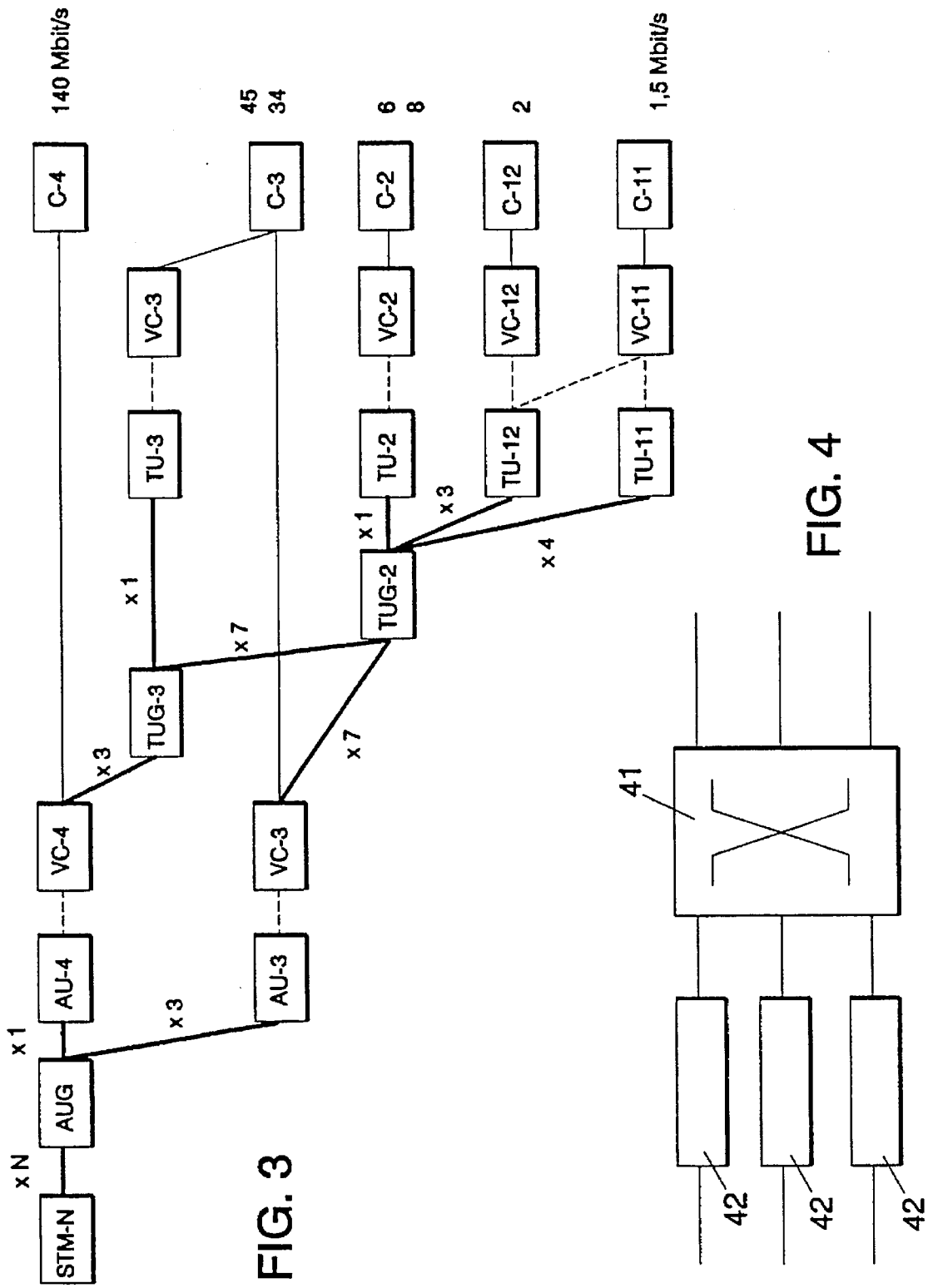

METHOD AND EQUIPMENT FOR MONITORING THE FILL RATE OF AN ELASTIC BUFFER MEMORY IN A SYNCHRONOUS DIGITAL TELECOMMUNICATION SYSTEM

BACKGROUND OF THE INVENTION

The invention relates to a method and to an equipment for monitoring the fill rate of an elastic buffer memory.

The current digital transmission network is plesiochronous, that is, e.g. each 2-Mbit/s basic multiplex system has a dedicated clock independent of any other system. It is therefore impossible to locate a single 2-Mbit/s signal in the bit stream of a higher-order system, but the higher-level signal has to be demultiplexed through each intermediate level down to the 2 Mbit/s level to extract the 2-Mbit/s signal. For this reason, especially the construction of branch connections requiring several multiplexers and demultiplexers has been expensive. Another disadvantage of the plesiochronous transmission network is that equipments from two different manufacturers are not usually compatible.

The above drawbacks, among other things, have led to the introduction of the new synchronous digital hierarchy SDH specified e.g. in the CCITT specifications G.707, G.708 and G.709. The synchronous digital hierarchy is based on STM-N transfer frames (Synchronous Transport Modules) located on several levels of hierarchy N (N=1,4,16 . . . ). Existing PCM systems, such as 2-, 8- and 32-Mbit/s systems are multiplexed into a synchronous 155.520-Mbit/s frame of the lowest level of the SDH (N=1). Consistently with the above, this frame is called the STM-1 frame. On the higher levels of hierarchy the bit rates are multiples of the bit rate of the lowest level.

FIG. 1 illustrates the structure of the STM-N frame, and FIG. 2 illustrates a single STM-1 frame. The STM-N frame comprises a matrix with 9 rows and N×270 columns so that there is one byte at the junction point between each row and the column. Rows 1–3 and rows 5–9 of the N×9 first columns comprise a section overhead SOH, and the row 4 comprises an AU pointer. The rest of the frame structure is formed of a section having the length of N×261 columns and containing the payload section of the STM-N frame.

FIG. 2 illustrates a single STM-1 frame which is 270 bytes in length, as described above. The payload section comprises one or more administration units AU. In the specific case shown in the figure, the payload section consists of the administration unit AU-4, into which a virtual container VC-4 is inserted. (Alternatively, the STM-1 transfer frame may contain several lower-level administration units (AU-3) each containing a corresponding lower-level virtual container (VC-3)). The VC-4 in turn consists of a path overhead POH located at the beginning of each row and having the length of one byte (9 bytes altogether), and of the payload section in which there are lower-level frames also comprising bytes allowing interface justification to be performed in connection with mapping when the rate of the information signal to be mapped deviates from its nominal value to some extent. Mapping of the information signal into the STM-1 frame is described e.g. in the patent applications AU-B-34689/89 and FI-914746.

Each byte in the AU-4 unit has its own location number. The above-mentioned AU pointer contains the location of the first byte of the VC-4 container in the AU-4 unit. The pointers allow positive or negative pointer justifications to be performed at different points in the SDH network. If a virtual container having a certain clock frequency is applied to a network node operating at a clock frequency lower than the above-mentioned clock frequency of the virtual container, the data buffer will be filled up. This requires negative justification: one byte is transferred from the received virtual container into the overhead section while the pointer value is decreased by one. If the rate of the received virtual container is lower than the clock rate of the node, the data buffer tends to be emptied, which calls for positive justification: a stuff byte is added to the received virtual container and the pointer value is incremented by one.

FIG. 3 shows how the STM-N frame can be formed of existing asynchronous bit streams. These bit streams (1.5, 2, 6, 8, 34, 45 or 140 Mbit/s, shown in the right in the figure) are packed at the first stage into containers C specified by CCITT. At the second stage, overhead bytes containing control data are inserted into the containers, thus obtaining the above-described virtual container VC-11, VC-12, VC-2, VC-3 or VC-4 (the first suffix in the abbreviations represents the level of hierarchy and the second suffix represents the bit rate). This virtual container remains intact while it passes through the synchronous network up to its point of delivery. Depending on the level of hierarchy, the virtual containers are further formed either into tributary units TU or into AU units (AU-3 and AU-4) already mentioned above by providing them with pointers. The AU unit can be mapped directly into the STM-1 frame, whereas the TU units have to be assembled through tributary unit groups TUG and VC-3 and VC-4 units to form AU units which then can be mapped into the STM-1 frame. In FIG. 3, the mapping is indicated by a continuous thin line, the aligning with a broken line, and the multiplexing with a continuous thicker line.

As is to be seen from FIG. 3, the STM-1 frame may be assembled in a number of alternative ways, and the content of the highest-level virtual container VC-4, for instance, may vary, depending on the level from which the assembly has been started and in which way the assembly has been performed. The STM-1 signal may thus contain e.g. 3 TU-3 units or 21 TU-2 units or 63 TU-12 units. As the higher-level unit contains several lower-level units, e.g. the VC-4 unit contains TU-12 units (there are 63 such units in a single VC-4 unit, cf. FIG. 3), the lower-level units are mapped into the higher-level frame by interleaving so that the first bytes are first taken consecutively from each one of the lower-level units, then the second bytes, etc. Accordingly, when the VC-4 signal contains the above-mentioned 63 TU-12 signals, these signals are located in the VC-4 frame as shown in FIG. 2, i.e. the first byte of the first TU-12 signal is located first, then the first byte of the second TU-12 signal, etc. After the first byte of the last signal, i.e. the 63rd TU-12 signal, the second byte of the first TU-12 signal follows, etc. Fours bytes of each TU-12 signal will thus be located on each row of the STM-1 frame, the entire STM-1 frame comprising 4×9=36 bytes. In a basic case, one complete TU-12 frame having the length of 500 µs is divided into four consecutive STM-1 frames. The TU-12 frame comprises four pointer bytes V1–V4 so that the first quarter of the TU-12 frame contains the pointer byte V1, the second quarter contains the pointer byte V2, etc. The first two bytes V1 and V2 form the actual TU pointer value; the byte V3 is used for justification; and the byte V4 is reserved for other purposes. The TU-12 pointer consisting of the bytes V1 and V2, points to the first byte in the VC-12 unit. This first byte is indicated generally by the reference V5. The structure of the TU-12 frame appears more clearly from FIGS. 8 and 13, which will be referred to in more detail below.

The above-described SDH frame structures and the assembly of such structures have been described in References [1] and [2], which are referred to for a more detailed description (the references are listed at the end of the specification).

When e.g. the above-described TU-1, TU-2 or TU-3 level signals are switched e.g. in a SDH cross-connect equipment 41 shown in FIG. 4, all signals of the same level of hierarchy to be switched have to be fully synchronous with each other, that is, clocked by the same clock signal edge. In addition, the frames of the signals to be switched have to be equal in phase.

The above-described synchronization may take place in the synchronizing unit 42 of each incoming line, where the payload of the signal coming to the cross-connect equipment 41 is stored in an elastic buffer in synchronization with a clock signal extracted from the incoming signal and is read from the elastic buffer in synchronization with the clock signal of the cross-connect equipment. In order to determine the payload to be written into the elastic buffer and the phase of the payload, the control data contained in the higher-level frames, such as pointers, have to be disassembled. Correspondingly, it is necessary that the higher-level SDH frame structures and associated control data can be added to the payload to be read from the elastic buffer.

The payload of a predetermined level of hierarchy has to pass through the elastic buffer in order that the synchronization with the clock sync of the cross-connection would be successful. If there are several channels of the same level of hierarchy, each channel has to have its own independent elastic buffer. For instance, when the 63 VC-12 signals contained in a single STM-1 frame are synchronized as described above, 63 elastic buffers independent of each other are required. It has to be possible to monitor the fill rate of each one of the elastic buffers independently of the other elastic buffers.

In the prior art, the fill rate of the buffers is monitored by constructing a single unit monitoring the fill rate of the elastic buffer, and this unit is then reproduced so that each elastic buffer has its own dedicated unit for monitoring the fill rate. A schematic block diagram illustrating this solution is shown in FIG. 5, where the buffering of 63 TU-12 channels in a synchronizing unit 42 is used as an example similarly as above. A signal having the STM-1 frame structure is first applied to a common interpretation unit 51 which interprets the AU pointer data and the H4 byte in the path overhead POH of the VC-4 container so as to locate the TU-12 frames contained in the frame structure. The interpretation unit 51 then forwards the bytes of each one of the TU-12 channels to the dedicated interpretation unit 52 of the respective channel, of which there thus are 63 in this specific example. The interpretation unit interprets the pointer of each TU-12 channel to determine the phase of the VC-12 signal. Due to the interleaving of the TU-12 units in the frame structure, each interpretation unit operates only for about 1/63 of the available time. Each VC-12 signal is stored in its dedicated elastic buffer 53 which is independent of the other buffers 53. When reassembling the frame structure of the highest level, the pointer data of each new TU-12 unit is generated in a dedicated generation unit 54, whereafter the final frame structure is assembled in a common generation unit 55 by combining the payloads from the elastic buffer memories with the new pointers and the new control data. The fill rate of each one of the elastic buffers 53 is monitored by a separate dedicated monitoring unit 56.

AU and TU pointers as well as their generation and interpretation are described in Reference [1], which is referred to for more detailed description.

A problem with the above-described prior art way of monitoring is the high requirement of hardware (large silicon area).

SUMMARY OF THE INVENTION

The object of the present invention is to avoid the above-described problem and provide a method which allows the fill rate of the channels to be monitored with less hardware than previously.

The basic idea of the invention is to utilize a time-division architecture to monitor the fill rate so that the fill rate of at least two channels of the same level of hierarchy is monitored on a time-division basis in a monitoring unit common to said channels.

When using the time-division monitoring method according to the invention, the required silicon area can be minimized by monitoring the fill rate of all channels on the same level of hierarchy on a time-division basis in a monitoring unit common to all said channels.

BRIEF DESCRIPTION OF THE DRAWINGS

In the following, the invention will be described more closely by way of example with reference to FIGS. 6 to 10 in the attached drawings, in which:

FIG. 3 illustrates the assembly of the STM-N frame from existing PCM systems;

FIG. 4 is a block diagram illustrating an SDH cross-connect equipment having synchronizing units utilizing the buffering method according to the invention;

DETAILED DESCRIPTION

Figure 6:
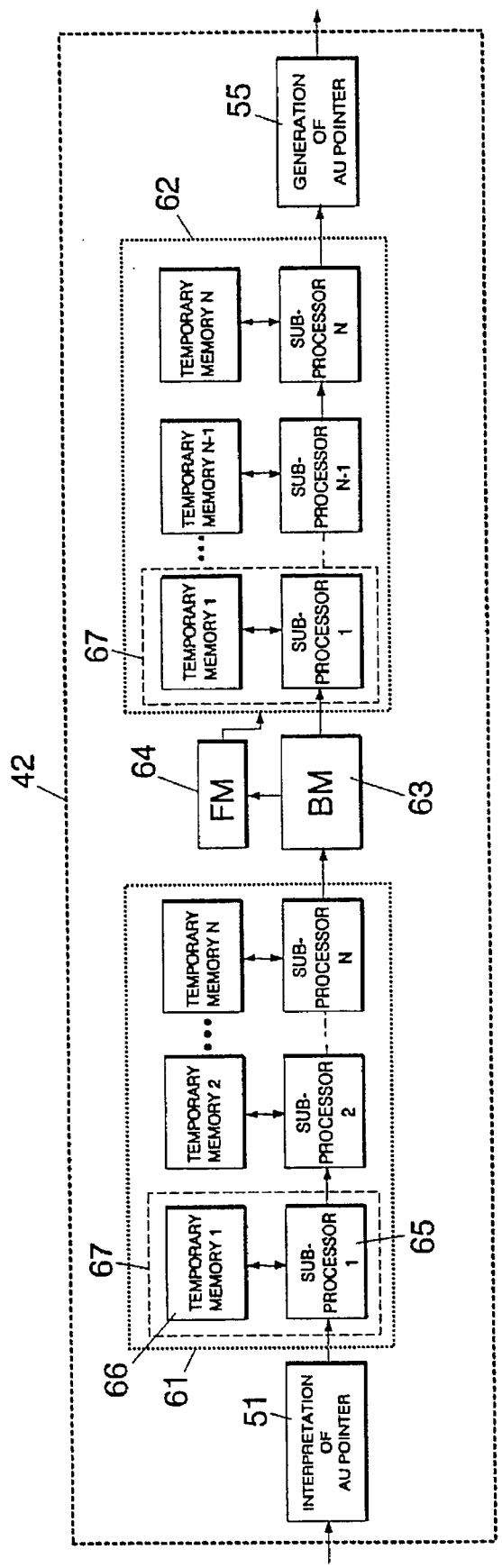
FIG. 6 is a block diagram illustrating the buffering principle in a synchronizing unit utilizing the method according to the invention.

FIG. 6 shows a single time-divisional synchronizing unit applying the monitoring principle according to the invention. The time-division principle is also applied to the assembly and disassembly of the frame structure and to the elastic buffering, which are the subject-matter in parallel patent applications. A synchronizing unit 42 comprises sequentially arranged disassembly and assembly units 61 and 62 for TU-12 channels. An elastic buffer memory 63 common to all TU-12 channels is provided between the disassembly and assembly units, and the fill rate of the buffer memory is monitored by a common monitoring unit 64. The synchronizing unit 42 synchronizes an incoming AU-4 signal with another AU-4-level clock. The STM-1 signal is first applied to a common AU interpretation unit 51 which interprets AU-4 pointer data in a known manner (in compliance with the CCITT specifications, see Reference [1]), extracts the TU-12 signals from the AU-4 frame and applies the TU-12 signals to the disassembly unit 61 for further processing. The disassembly unit 61 interprets the TU-12 pointers and extracts the VC-12 data from the TU-12 frame structure. The pointers are processed at one or more processing stages on a time-division basis, that is, the processing of at least two signals on the same level of hierarchy is performed over the same physical line. The disassembly unit 61 thus comprises a subprocessing unit 67 formed of at least one subprocessor 65 and a temporary memory 66. The subprocessing unit processes the pointers of the frame structure of at least two signals on the same level of hierarchy. In the example described in this specification the fill rate of all 63 TU-12 channels is monitored in the same monitoring unit, but this is not necessary as several monitoring units may as well be positioned in parallel or in succession, provided that the fill rate of at least two of the TU-12 channels is monitored on a time-division basis in a monitoring unit common to these channels.

The VC-12 payload coming to the TU disassembly unit 61 propagates through it unchanged, and is stored in the buffer memory 63 common to all TU-12 channels. The fill rate of the buffer memory 63 is monitored by the common monitoring unit 64 in accordance with the invention. The reassembly of the TU-12 pointers and frames is performed in the assembly unit 62 at one or more processing stages on a time-division basis, that is, the signals of at least two channels are processed over the same physical line. The TU assembly unit 62 comprises a subprocessing unit 67 consisting of at least one subprocessor 65 and a temporary memory 66. The subprocessing unit 67 processes the pointers of the frame structure of at least two signals on the same level of hierarchy. In the present example all 63 channels are processed in the same assembly unit but this is not necessary as it is equally possible to position several assembly units in parallel or in succession.

Figure 7:
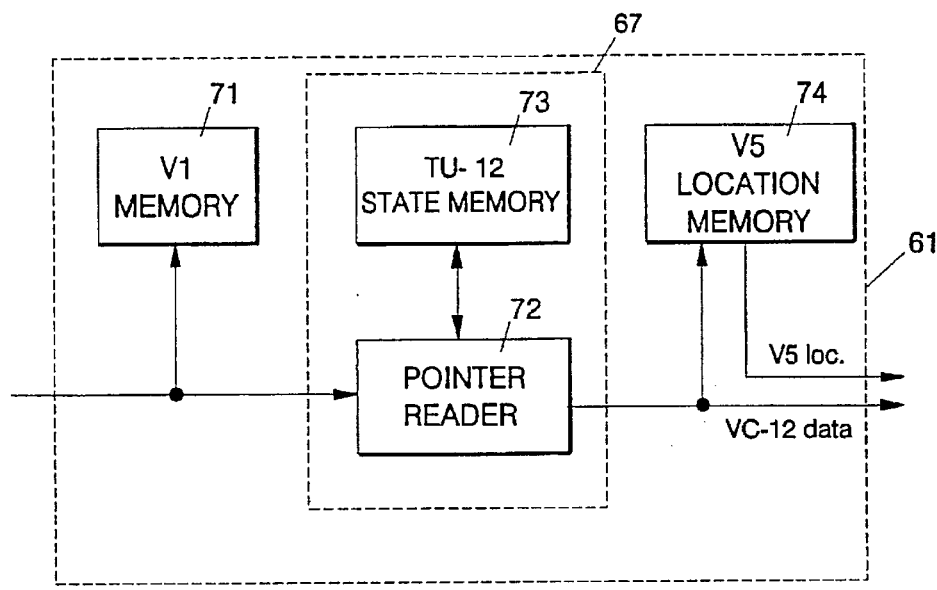
FIG. 7 is a more detailed view of the frame structure disassembly unit of the synchronizing unit shown in FIG. 6.
Figure 8:
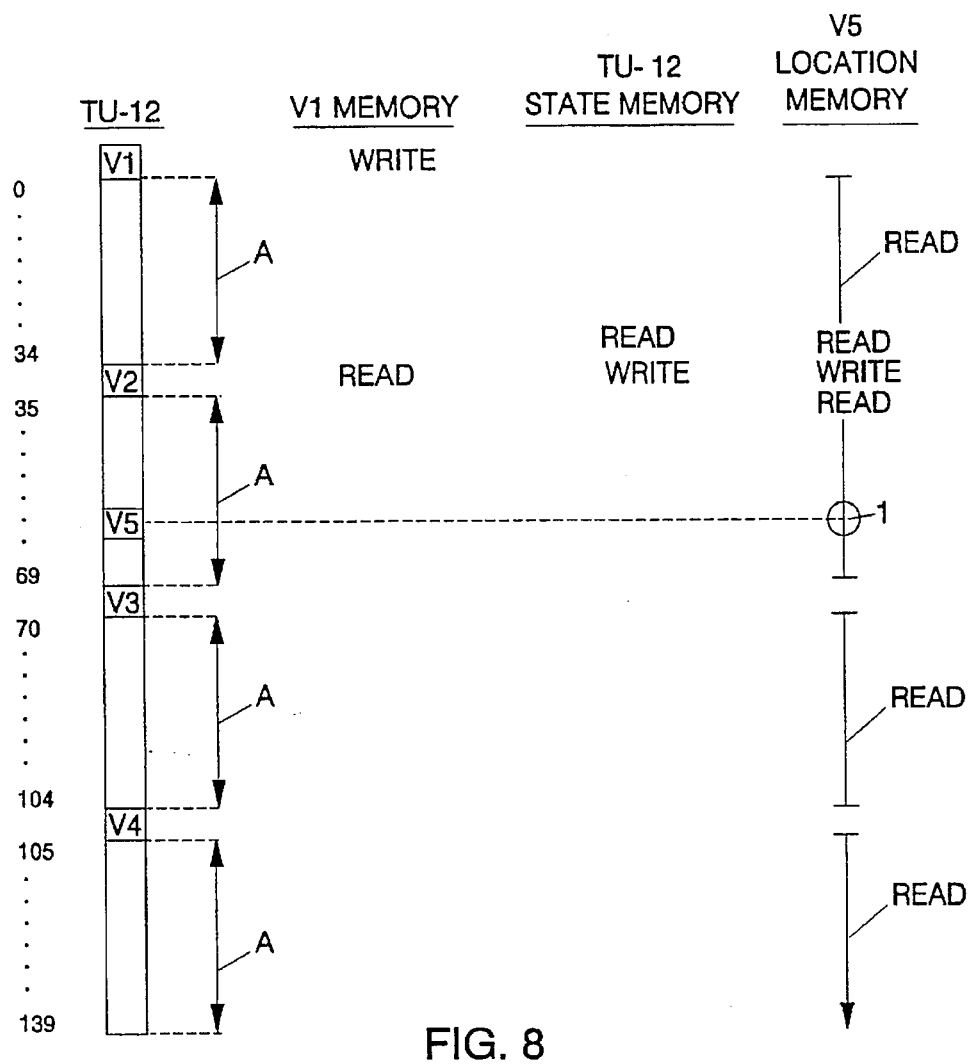
FIG. 8 illustrates the operation of the disassembly unit shown in FIG. 7 for a single frame of a single TU-12 signal.

FIG. 7 shows in more detail a single disassembly unit 61 comprising a V1 memory 71; a subprocessing unit formed of a TU-12 state memory 73 and a pointer read unit 72; and a V5 location memory 74. In the following the operation of the disassembly unit will be described for a single frame of a single TU-12 signal while referring to FIG. 8, in which there is a single TU-12 frame drawn in the left-hand side column; as is known per se the TU-12 frame comprises 140 data bytes (numbered beside the frame) and four pointer bytes V1 to V4. The length of one TU-12 frame is 500 μs so that it will be transmitted in four STM-1 frames in a basic case. The other columns shown in FIG. 8 illustrate the read and write events associated with the V1 memory 71, the TU-12 state memory 73 and the V5 location memory 74. The procedure is similar for any other TU-12 signal; in processing two consecutive signals, there is only a shift of one clock period in the time domain between the signals (the same applies to the assembly unit to be described below).

The first byte of the TU-12 frame applied to the TU disassembly unit, that is, the V1 byte, is first stored in the V1 memory 71. The data bytes coming after the V1 byte are stored in the buffer memory 63 as well as all other data bytes. In FIG. 8, the periods during which VC-12 data is stored in the buffer memory are indicated by the arrows A. When the second quarter of the TU-12 frame begins from the V2 byte, the V1 byte is read from the memory and a new pointer word is generated for the pointer read unit 72 by combining the V1 and V2 bytes. A little before the generation of the new pointer word the old state of the pointer is read from the state memory 73 to the read unit. The old state comprises data on the values of the preceding (valid) pointer. The pointer read unit 72 processes the data received by it, as a result of which new state data is obtained and stored in the state memory 73. In addition, a V5 flag (1 bit) is written concurrently in the V5 location memory 74 to an address determined by the new state. The location memory 74 comprises 63×140 memory locations having the length of one bit, that is, each channel has a memory location for each data byte of the TU-12 frame. The V5 flag, that is, the logical one, is written to an address corresponding to the data byte to which the new pointer points. The other 139 memory locations contain the logical zero. The V5 location memory is read during the data bytes of the TU-12 frame, a value deviating from zero being obtained at a certain point (indicating the location of the V5 byte). Information about the location of the V5 byte (V5 loc. signal, FIG. 7) is stored in the buffer memory.

The incoming V1 and V2 bytes also indicate whether the pointer justification mentioned above has to be performed. With a negative justification, the content of the V3 byte is written in the buffer memory; with a positive justification, the data byte following the V3 byte is not written in the buffer memory.

Figure 9:
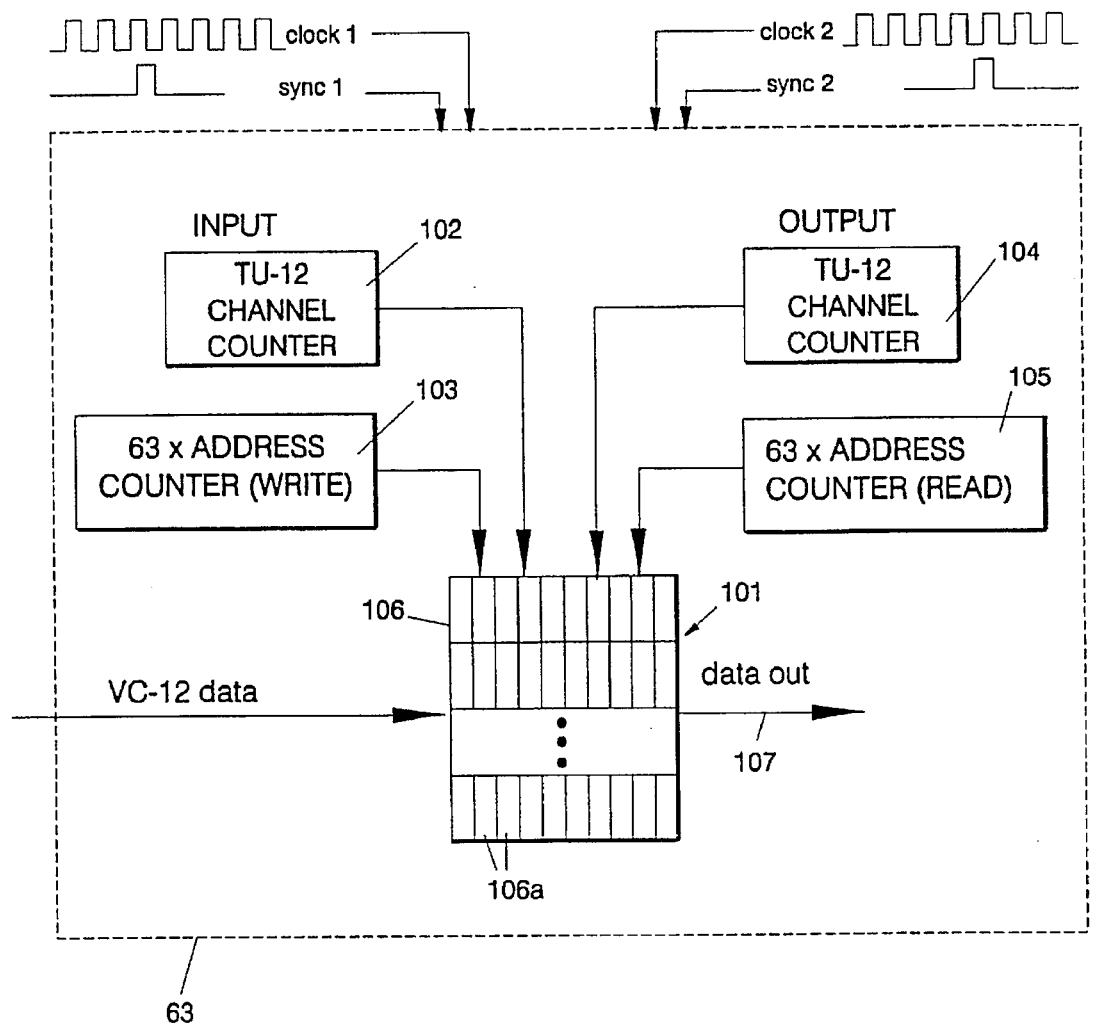
FIG. 9 is a more detailed view of the elastic buffer of the synchronizing unit.

FIG. 9 is a more detailed view of the elastic buffer 63, in which e.g. the VC-12 data is stored. The buffer comprises a buffer memory 101 itself and counter units controlling the buffer memory. On the input side the counter units include a first channel counter 102 and a first address counter unit 103; on the output side, there are a second channel counter 104 and a second address counter unit 105. The units on the input side control the writing of data into the memory while the units on the output side control the reading from the memory. On the input side the writing is synchronized by clock and synchronizing signals clock1 and sync1, and on the output side by clock and synchronizing signals clock2 and sync2, which are independent of the corresponding signals on the input side. The buffer memory 101 comprises 63 memory units 106 (one for each channel), each comprising (in this specific case) 10 consecutive memory locations 106a having the width of 8 bits (i.e. the width of one byte). (In this specific case, a memory space of ten memory locations is reserved in each memory unit to allow for gaps in the SDH frame structures and various delays, among other things; the number of memory locations may be other than ten, e.g. sixteen). The address counter unit 103 comprises 63 address counters each one of which counts from one to ten, addressing a corresponding memory location in one memory unit. The phase of each address counter may be different as the fill rate of each channel in the buffer may vary. The first channel counter 102 counts continuously from one to sixty-three (1–63), and it is synchronized by the synchronizing signal sync1. The channel counter 102 selects one of the first address counters on a time-division basis, and a corresponding byte is written in the memory location 1 to 10 addressed by the selected address counter in the respective memory unit.

On the output side the address of the byte to be read is generated in a corresponding manner by the second channel counter 104 and the second address counter unit 105: the channel counter 104 selects one of the second address counters on a time-division basis, and the byte is read from the memory location addressed by the selected address counter to the output 107 of the buffer memory.

Figure 10:
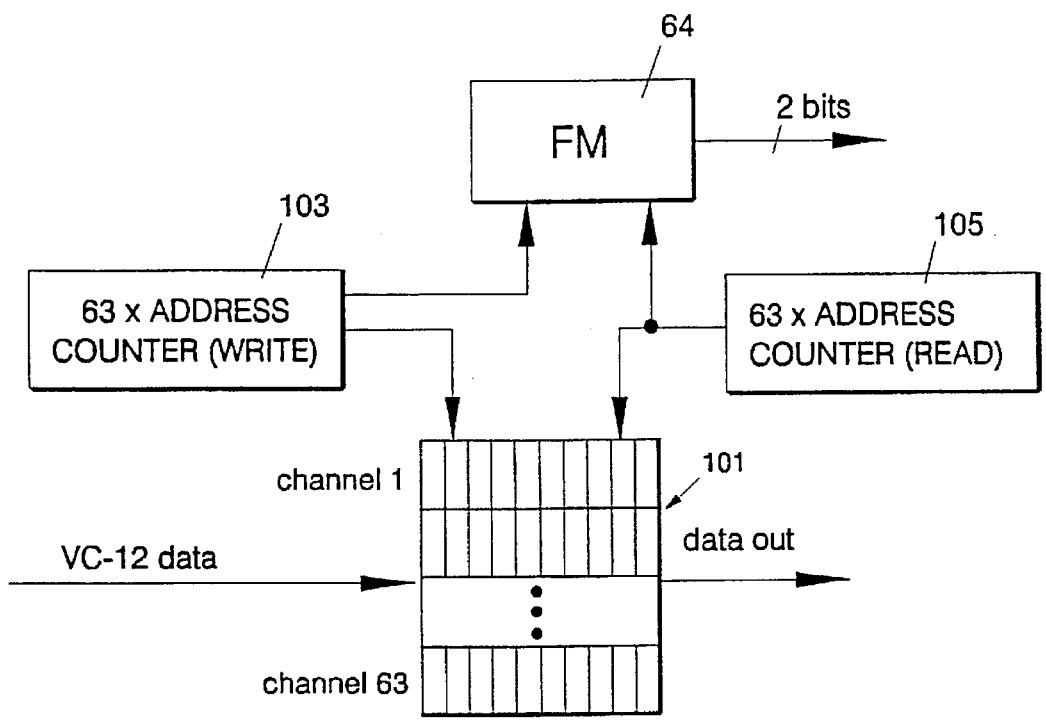
FIG. 10 illustrates the method according to the invention for monitoring the fill rate of the elastic buffer.
Figure 11:
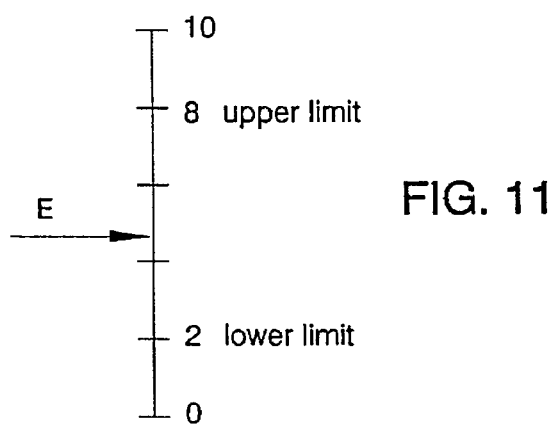
FIG. 11 illustrates the range of variation of a difference value used in monitoring the fill rate of the elastic buffer.

FIGS. 10 and 11 are more detailed views illustrating the monitoring of the fill rate of the elastic buffer, which according to the invention is performed by the common monitoring unit 64. The fill rate of each memory unit 106 (i.e. that of each TU-12 channel) is monitored by applying the values of the first and the second address counter (the read and write counters) to the inputs of the monitoring unit 64 separately for each channel. The monitoring unit subtracts from the value of the read counter the value of the write counter and compares a resulting difference value E with predetermined limit values, which may be e.g. 2 and 8, as in FIG. 11. In an ideal situation the difference value E is about 5 (a medium value).

The monitoring of the fill rate is effected in synchronization with the output side (the read side). In order that the monitoring unit 64 would be able to compare the values of the same channel with each other, the address data obtained from the write counter 103 should be in phase with the address data from the read counter 105, i.e. the counters should correspond to the same channel (the channel to be selected on the write side is not the channel to which data is being written).

Depending on the difference value, the fill monitoring unit outputs data about the fill rate of each channel by using three different states indicated by 2 bits (full/empty/appropriate), and the data is applied to the TU assembly unit.

Figure 12:
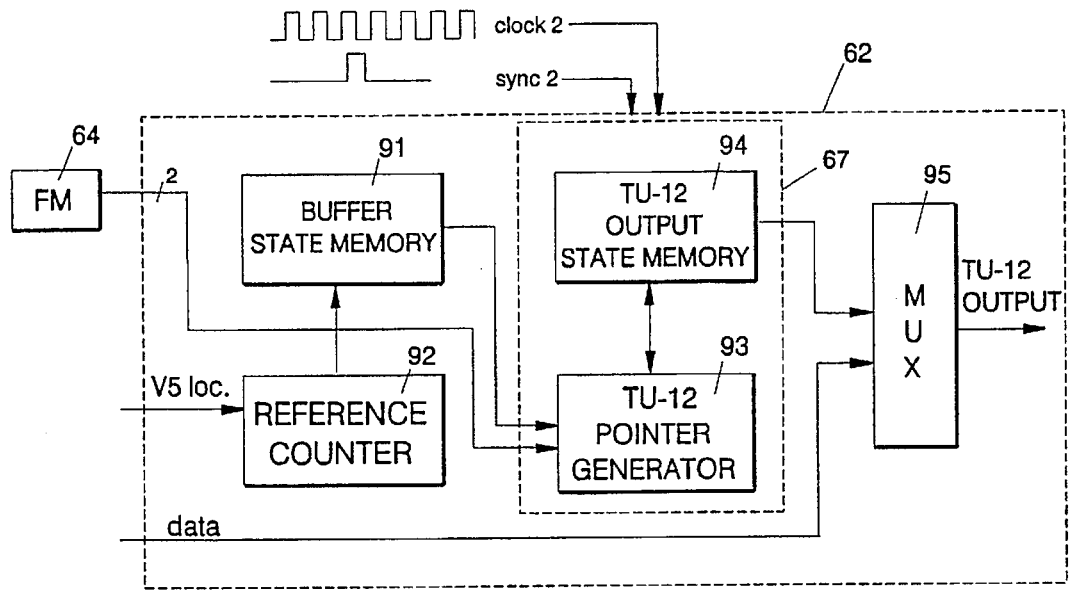
FIG. 12 is a more detailed view of the assembly unit of the synchronizing unit shown in FIG. 6, in which the frame structure is reassembled.
Figure 13:
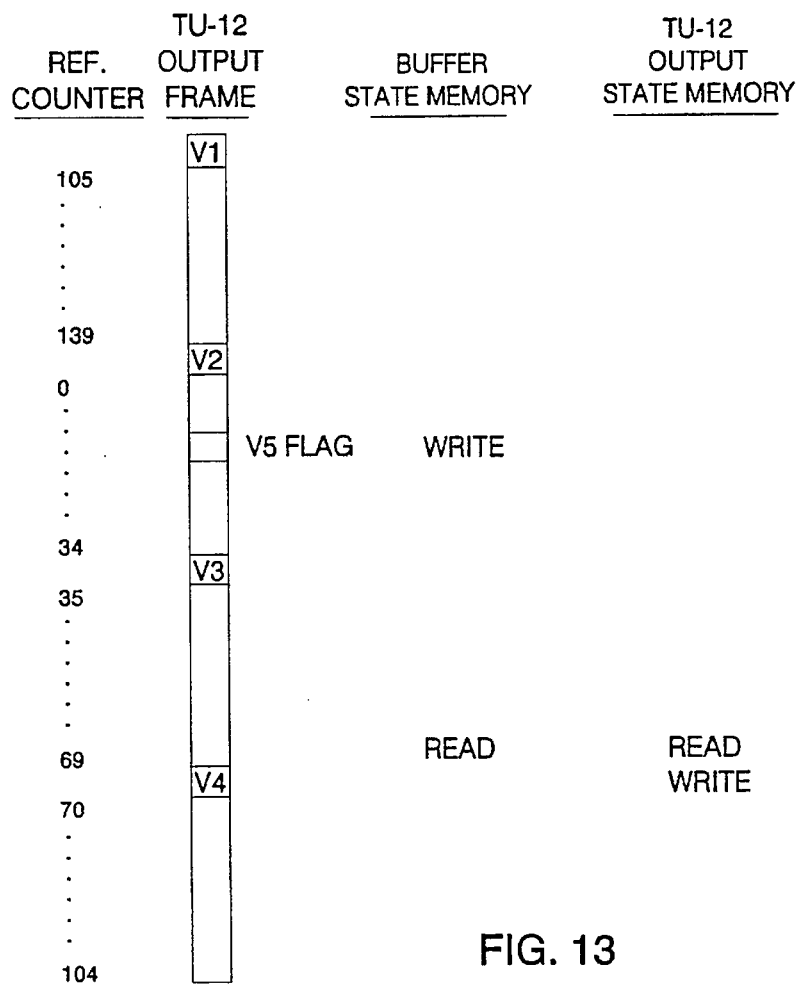
FIG. 13 illustrates the operation of the assembly unit shown in FIG. 12 for a single frame of a single TU-12 signal.

FIGS. 12 and 13 illustrate the structure and operation of the TU assembly unit 62 of the synchronizing unit 42 similarly as the operation of the disassembly unit is illustrated in FIGS. 7 and 8. The assembly unit 62 generates the above-described V bytes and decides whether justification is required. The only variable on the frame structure assembly side is the TU-12 pointer. When the frame is being assembled, the above-described V5 byte may be at any location in the TU-12 frame, and this location has to be indicated by the V1 and V2 bytes (the time instant of the V5 flag obtained from the buffer memory has to be converted into a pointer number). The clock and synchronizing signals clock2 and sync2 for the assembly side (FIG. 9) are independent of the respective signals of the disassembly unit, whereas they are equal to those used on the read side of the buffering.

A reference counter 92 and a buffer state memory 91 connected to it are provided at the input of the assembly unit. The buffer state memory 91 in turn is connected to a TU-12 pointer generator 93 which constitutes its own subprocessing unit 67 together with the state memory 94 of the output. The output of the state memory is connected to a multiplexer 95 having another input to which data bytes from the buffer memory 63 are connected directly.

The reference counter 92 counts the bytes 0 to 139 of the VC-12 frame (FIG. 13, the left-hand side column). The V5 location data signal (V5 loc.) is applied to the input of the assembly unit. This signal corresponds to the signal generated in the disassembly unit. When the V5 flag is received, the current value of the reference counter is stored in the state memory 91 of the buffer. At a predetermined time instant (at the V4 byte) before the transmission of the pointer byte, the TU-12 pointer generator 93 performs the processing. For the processing the value of the reference counter from the state memory 91 of the buffer, and the old state data of the TU-12 pointer from the state memory 94 of the output are read into the pointer generator. The processing produces new pointer state data containing e.g. the values of the V1 and V2 bytes. The new state data is stored in place of the old data in the state memory of the output. The state data of the pointer and the data from the buffer memory are combined in the multiplexer 95, which out-puts the reassembled TU-12 channels.

Pointer justification is performed in the assembly unit by applying data on the fill rate of the buffer from the monitor 64 to the TU-12 pointer generator 93. The data indicating one of the three possible states (full, empty, appropriate, as described above) is represented by two bits. The pointer generator 93 interprets the fill rate so as to decide whether justification is required.

Figure 1:
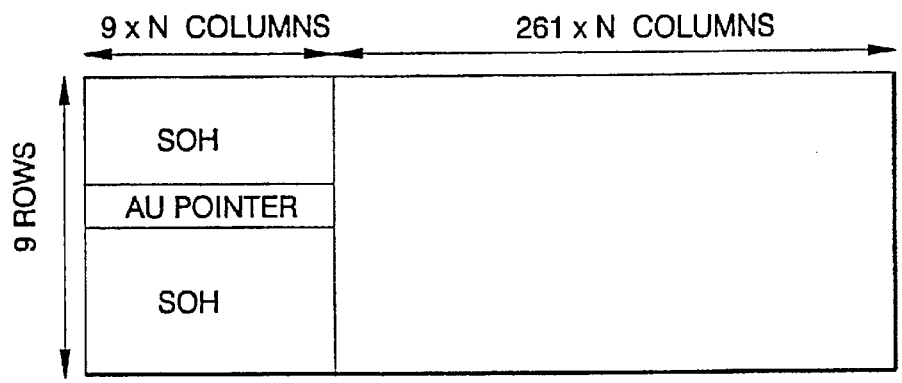
FIG. 1 illustrates the basic structure of a single STM-N frame.
Figure 2:
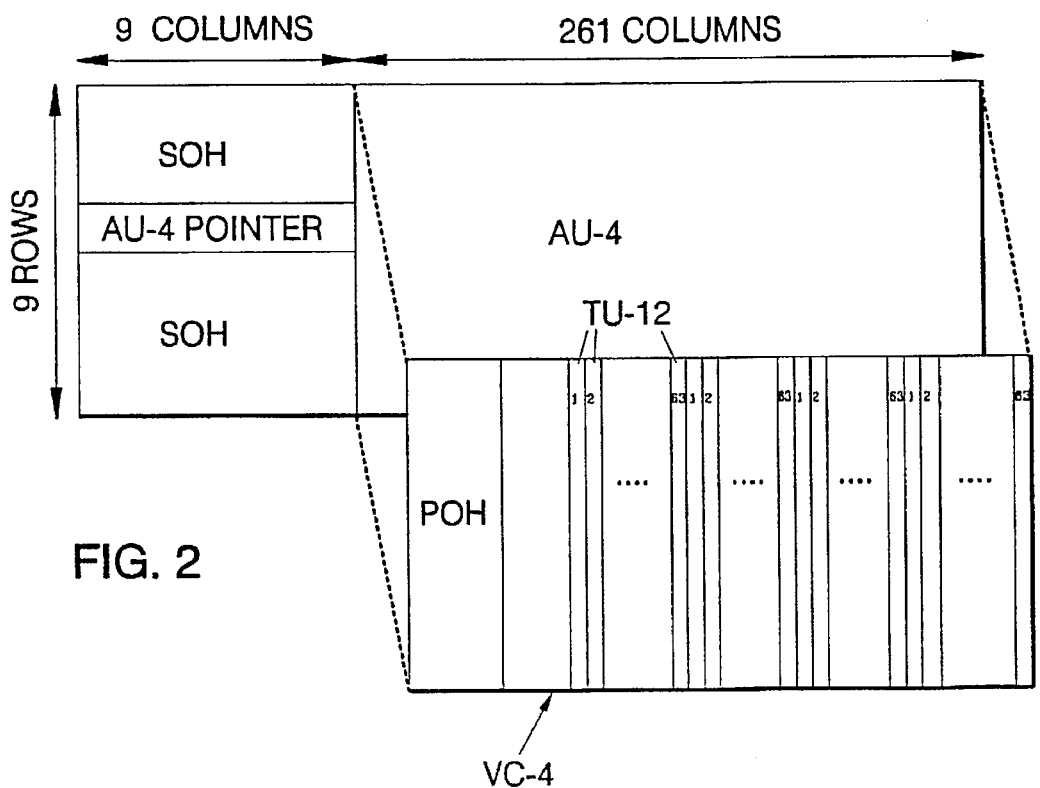
FIG. 2 illustrates the structure of a single STM-1 frame.
Figure 5:
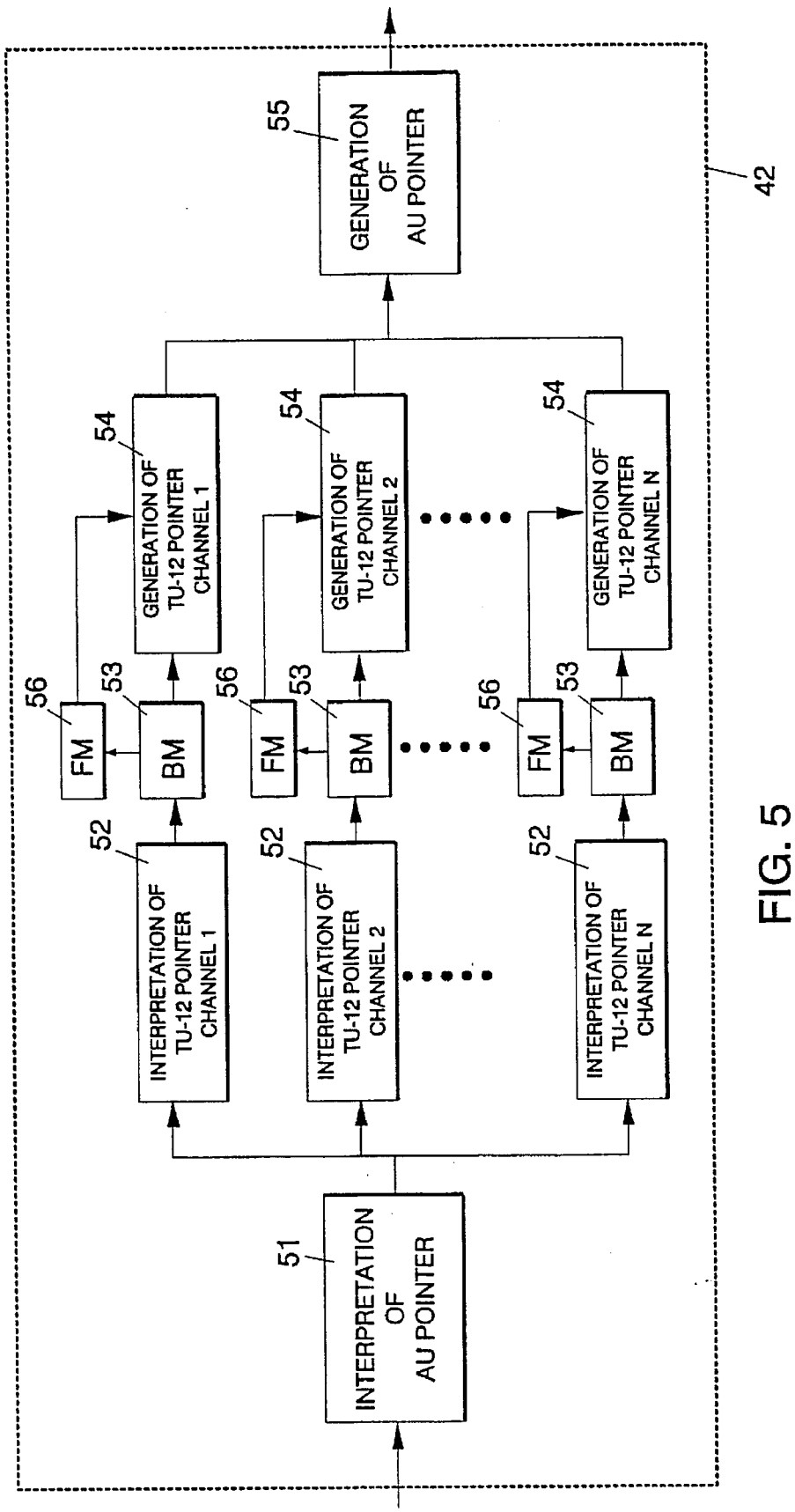
FIG. 5 is a block diagram illustrating the buffering principle in prior art arrangements.

The signal obtained at the output of the TU assembly unit is applied to the AU generation unit 55 (FIGS. 5 and 6), where the final AU-4 signal is generated in a manner known per se.

Even though the invention has been described above with reference to the examples shown in the attached drawings, the invention is not, of course, restricted to them but may be modified in various ways within the inventive idea disclosed above and in the accompanying claims. Even though SDH specific terms have been used above by way of example, the invention is equally applicable in the corresponding American SONET system or in any other similar system in which the frame structure comprises a predetermined number of bytes of fixed length, and in which the frame structure comprises a pointer indicating the phase of the payload within the frame structure. Similarly, the invention may be applied to monitoring on different levels of hierarchy in the above-mentioned systems. The disassembly or assembly of the frame or the buffering need not necessarily take place on a time-division basis, as above, but the fill rate may also be monitored as described above whatever the way in which the disassembly, assembly and buffering are effected. The unit monitoring the common channels according to the invention may also form part of a larger monitoring unit, irrespective of the way in which the monitoring results are outputted from the larger monitoring unit.

References

[1] CCITT Blue Book, Recommendation G.709: "Synchronous Multiplexing Structure", May 1990.
[2] SDH—Ny digital hierarki, TELE 2/90.

We claim:

1. A method for monitoring the fill rate of an elastic buffer memory used in a synchronous digital telecommunication system, such as the SDH or SONET system, in which system the frame structure comprises a predetermined number of bytes of fixed length and a pointer indicating the phase of payload within the frame structure, comprising:

storing signals of the same level of hierarchy within the frame structure in a buffer memory, continuously monitoring the fill rate of at least two channels of the buffer memory having the same level of hierarchy, on a time-division basis, in a monitoring unit common to said channels.

2. The method according to claim 1, wherein:

the fill rate of all channels of the same level of hierarchy is monitored on a time-division basis in said monitoring unit, which is common to all said channels.

3. Equipment for monitoring the fill rate of an elastic buffer memory used in a synchronous digital telecommunication system, such as the SDH or SONET system, in which system the frame structure comprises a predetermined number of bytes of fixed length and a pointer indicating the phase of payload within the frame structure, the equipment comprising:

memory means for storing signals contained in the frame structure, monitoring means for continuously determining the fill rate of each channel, and means for applying a signal representing the fill rate of at least two channels of the same level of hierarchy to said monitoring means on a time-division basis.

* * * * *